May 2, 1961 R. U. GARRETT 2,982,332
APPARATUS FOR SHAPING AND BONDING LAMINATIONS
Filed Aug. 27, 1958 2 Sheets-Sheet 1
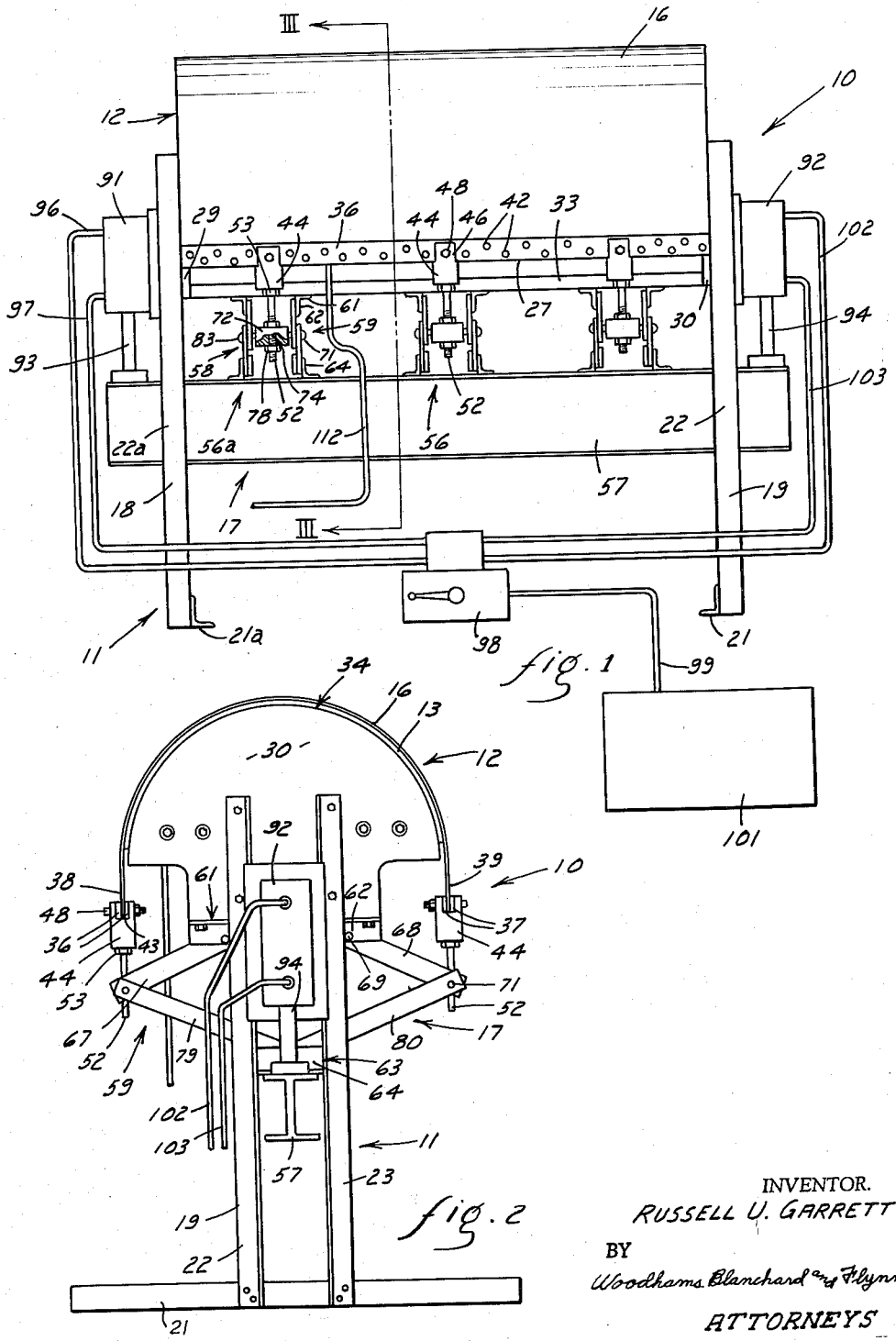
INVENTOR.
RUSSELL U. GARRETT
BY
Woodhams, Blanchard and Flynn
ATTORNEYS May 2, 1961  R. U. GARRETT  2,982,332
APPARATUS FOR SHAPING AND BONDING LAMINATIONS
Filed Aug. 27, 1958  2 Sheets-Sheet 2
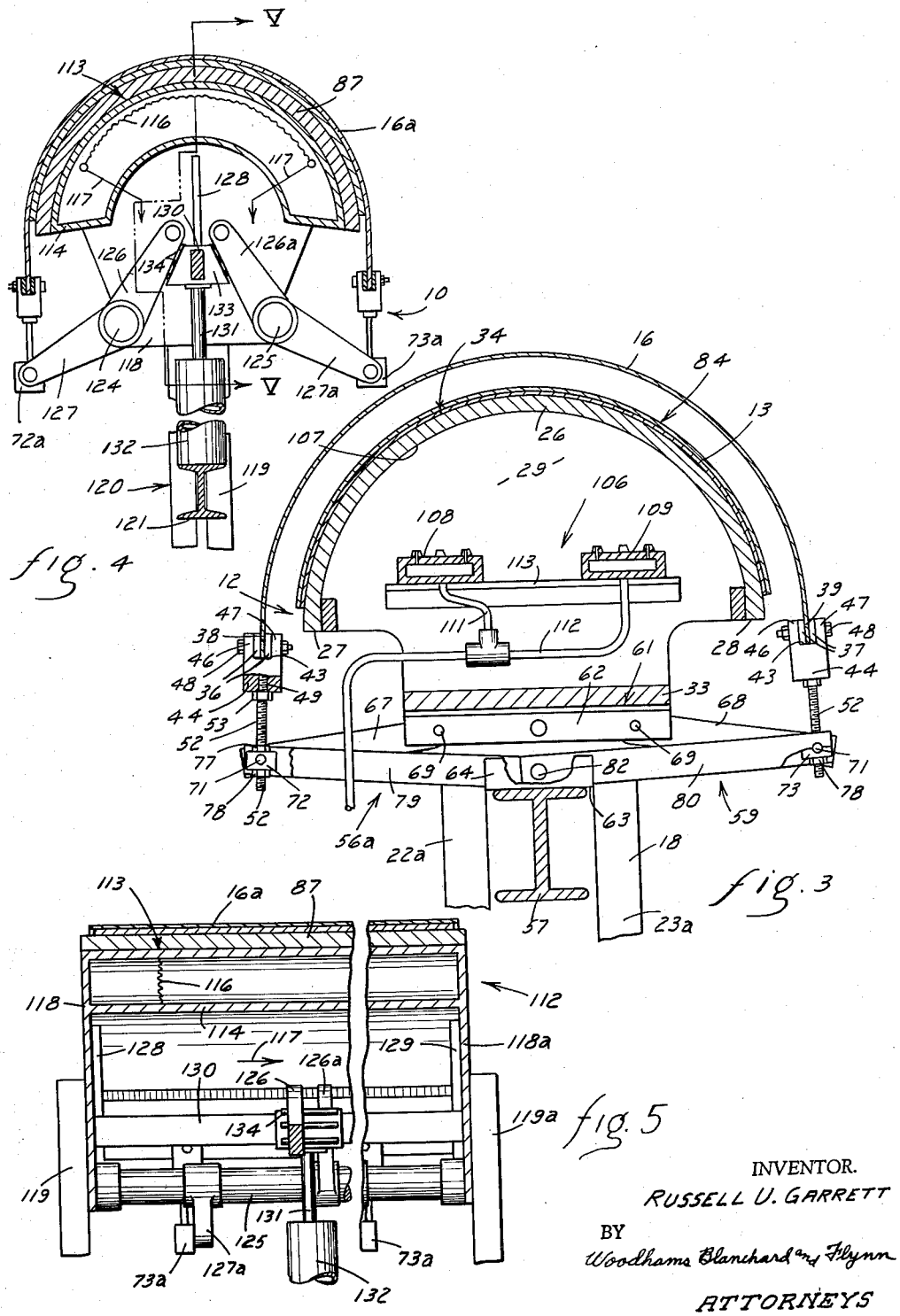
INVENTOR.
RUSSELL U. GARRETT
BY
Woodhams Blanchard and Flynn
ATTORNEYS

United States Patent Office 2,982,332
Patented May 2, 1961

2,982,332

APPARATUS FOR SHAPING AND BONDING LAMINATIONS

Russell U. Garrett, Ross Township, Kalamazoo, Mich. (R.R. 1, Box 644, Augusta, Mich.)

Filed Aug. 27, 1958, Ser. No. 757,618

3 Claims. (Cl. 154—1)

This invention relates in general to an apparatus and process for shaping and bonding together laminae to form an article having the shape of a portion of a cylinder and, more particularly, relates to an apparatus and process for shaping and bonding together laminae to form a laminated printing plate for a rotary printing press.

It is well known that printing plates of the type used in a rotary printing press must have a substantially uniform thickness in order to produce high quality printed materials having neither blurs nor voids. Heretofore, it has been extremely difficult, if not impossible, to provide a laminated printing plate having such uniform thickness. This has been largely due to the fact that it has been very difficult to control the thickness of the bonding material used to secure the laminae together, especially when the laminae are curved. Attempts have been made to solve this problem by bonding the laminae while same are in the flat condition and, thereafter, shaping the flat printing plate into the cylindrical form for use on a rotary printing press. However, due to the material thickness of the printing plate, the outer printing surface of the plate becomes distorted during the bending operation so that the finished product is not entirely satisfactory. Furthermore, heat is usually required to effect such bending and such heat often tends to cause variation in the thickness of the bonding materials and thereby creates the very problem of nonuniform thickness which this procedure was intended to overcome. It has been found, however, that where the outer lamina of the printing plate, which forms the printing surface, is shaped separately of the other laminae, including the backing material, such distortion can be materially reduced if not eliminated.

The problem of obtaining a bonding layer of uniform thickness between adjacent laminae has been materially reduced by providing a porous control sheet impregnated with the bonding material between adjacent laminae. Such a structure is disclosed in my copending application entitled "Laminated Printing Plate and Process for Making Same," Serial No. 726,537. However, as mentioned above, when the heat and pressure are applied to the laminae and bonding layer during the bonding procedure, irregularities of thickness can develop if such pressure is not uniformly applied.

Where a pair of carefully machined cooperating concave and convex dies are provided as the means for applying pressure to the laminae during the bonding operation, a semicylindrical laminated printing plate of highly uniform thickness can be produced. However, if there is a slight variation in the thickness of the laminated printing plate or if it becomes desirable to provide a printing plate of a different diameter than the dies are designed for, then such dies are of no use even though a structure having a controlled bonding layer such as that set forth in my above mentioned application Serial No. 726,537 is used. It is not economically feasible, even if possible, to provide dies for all of the variations in size which would be required to provide a completely flexible apparatus for producing laminated semicylindrical printing plates of the various sizes and thicknesses which may be required or desired. Furthermore, it is usually impossible to predetermine exactly what thickness will be optimum for any given type of plate due primarily to the fact that the thicknesses of the individual laminae cannot be controlled that accurately. Thus, present procedures for bonding together laminae to form a laminated, curved printing plate are not entirely satisfactory.

Accordingly, a primary object of this invention has been to provide a method and an apparatus for shaping and bonding together laminae to form a laminated semicylindrical printing plate for a rotary printing press.

A further object of this invention has been to provide a method and an apparaus, as aforesaid, which will maintain the thickness of individual semicylindrical laminated printing plates formed thereby uniform throughout even though successive printing plates formed by such apparatus have slightly different thicknesses.

A further object of this invention has been to provide an apparatus, as aforesaid, which is extremely simple in construction, which can be easily and quickly adapted for use on printing plates of different diameters, which is extremely reliable in operation, which can be operated by any person capable of conducting laminating operations, which is very inexpensive to operate, which occupies a minimum of floor space and which requires little or no maintenance and which is substantially foolproof in operation.

Other objects and purposes of this invention will become apparent to persons familiar with this type of equipment upon reading the following specification and examining the accompanying drawings in which:

Figure 1 is a side elevation view of an apparatus embodying the invention.

Figure 2 is an end elevational view of the apparatus.

Figure 3 is a sectional view taken along the line III—III of Figure 1 in which the solid line showing of the flexible sheet is spaced from the support member.

Figure 4 is a sectional view similar to Figure 3 illustrating a modified structure.

Figure 5 is a broken, sectional view of said modified structure taken along the line V—V of Figure 4.

For the purpose of convenience of description, the terms "upper," "lower" and derivatives thereof will have reference to the apparatus of the invention in its normal position of operation as appearing in Figures 1 and 2. The terms "inner," "outer" and derivatives thereof will have reference to the geometric center of said apparatus and parts thereof.

General description

The objects and purposes of this invention, including those set forth above, have been met by providing an apparatus, and a method for using such apparatus, which apparatus includes an upright base frame having a support member on its upper end arranged for supporting precurved laminae adapted to form a semicylindrical laminated printing plate. The support member has a semicylindrical upper surface which is substantially identical in diameter with the diameter of the roll on the rotary press (not shown) on which the laminated printing plate is to be mounted. The support member also has a cavity in which heating units are disposed for the purpose of heating the bonding material used between the laminae. A pressure sheet is supported adjacent the semicylindrical surface of the support member by linkage mounted upon the base frame. Actuating mechanism is provided for moving the linkage toward and away from the support member whereby the pressure sheet is moved away from and toward, respectively, the semicylindrical surface. The linkage is so constructed and arranged that the force applied thereby to the pressure sheet is perpendicular to a plane defined by the circumferential edges of the semicylindrical surface. Furthermore, this perpendicular relationship between the force applied to the pressure sheet and the plane defined by the edges of the semicylindrical surface is maintained even though the diameter of the printing plate is materially changed.

*Detailed construction*

The apparatus 10 (Figures 1 and 2) is comprised of an upright base frame 11 having a support member 12 mounted upon the upper end thereof for engaging and supporting laminae which, when bonded together, form the laminated printing plate 13. A pressure sheet 16 is held above the support member 12 by the operating mechanism 17 which is mounted upon said base frame 11 below said support member 12.

The base frame 11 includes a pair of upright end members 18 and 19 which may be, and preferably are, substantially identical. The end member 19, for example, has a horizontal base element 21 (Figure 2) and a pair of spaced upright elements 22 and 23 which are secured at their lower ends to said base element, preferably at equal distances from the opposite ends thereof. The elements 21 and 22 and 23 are fabricated from durable strong material such as structural steel angles. As shown in Figures 1 and 3, the end member 18 is similarly comprised of a base element 21a and a pair of upright elements 22a and 23a.

The support member 12 (Figures 2 and 3) is comprised of a semicylindrical shell 26 (Figure 3) of substantially constant thickness which is horizontally disposed so that the circumferential edges 27 and 28 thereof define a substantially horizontal plane. The shell 26 is secured at its axial ends to a pair of end plates 29 and 30 (Figures 3 and 2, respectively), which extend below the plane defined by the edges 27 and 28. The lower ends of the plates 29 and 30 are interconnected by a mounting plate 33 which, in this embodiment, is substantially horizontal and of less width than the inside diameter of the shell 26. The outer semicylindrical surface 34 of the shell 26 is preferably substantially identical to the roll of a printing press (not shown) upon which the printing plate 13 is to be mounted.

The flexible pressure sheet 16 in this particular embodiment consists of a relatively thin sheet of flexible material having a high tensile strength, such as steel, which is preferably substantially rectangular in shape. The sheet 16 is approximately as long as the axial length of the shell 26 and is slightly wider than the circumferential distance between the edges 27 and 28 of the shell 26. Thus, the pressure sheet 16 is capable of surrounding the entire outer surface 34 of the shell 26. Stiffening bars 36 and 37 are secured respectively to the edge portions 38 and 39 of the pressure sheet 16 by means such as the rivets 42 (Figure 1). The edge portions 38 and 39 of the sheet 16, including the stiffening bars 36 and 37, are slidably received into the notches 43 defined by the arms 46 and 47 of the connectors 44. Three axially spaced pairs of connectors 44 are provided, the connectors of each pair being transversely aligned and releasably secured respectively to the respective edge portions 38 and 39 by bolts 48. Each connector 44 has a threaded opening 49 extending upwardly from its lower end into which an elongated threaded rod 52 is threadedly received. A lock nut 53 also threadedly engages the rod 52 for holding said rod in a selected position with respect to the connector 44.

A horizontally disposed I beam 57 is positioned below the mounting plate 33 and is movable upwardly and downwardly with respect to base frame. The ends of said I beam 57 extend between, and are guided by, the legs in the end members 18 and 19.

The operating mechanism 17 includes three sets of substantially similar linkage units 56, each unit being associated with one of said pairs of connectors 44. Each of the linkage units 56, such as the linkage unit 56a shown in Figures 1 and 3, includes two pairs of substantially identical linkage assemblies 58 and 59 which are disposed on opposite sides of the pair of connectors 44 with which said linkage unit is associated. The linkage assembly 59 (Figure 3) includes an upper pivot bracket 61 which is secured to the lower surface of the mounting plate 33. The pivot bracket 61 may be formed of a structural angle having a flange extending transversely of said mounting plate 33 and having a downwardly extending flange 62. The assembly 59 also includes a lower pivot bracket 63, which may also be a portion of a structural angle, is secured to the upper surface of the I beam 57 and has an upwardly extending flange 64. The flanges 62 and 64 are substantially parallel with each other and are substantially vertically aligned. A pair of upper pivot arms 67 and 68 are pivotally supported respectively upon the flange 62 near the respective ends thereof by means such as the pivot pins 69. The outer ends of the upper pivot arms 67 and 68 are pivotally secured by means of the pivot pins 71 to the pivot blocks 72 and 73, respectively. The pivot blocks 72 and 73 each have a rod opening 74 therethrough, which opening is transverse of the pivot pins 71. The connector rod 52 is slidably received through opening 74. A pair of lock nuts 77 and 78 are threaded onto each connector rod 52 on opposite sides of the pivot blocks 72 and 73 for the purpose of holding said connector rods 52 in selected positions with respect to their pivot blocks 72 and 73.

The linkage assembly 59 also includes a pair of lower pivot arms 79 and 80 (Figure 3) whose inner ends overlap and are pivotally secured by means of pivot pin 82 upon the upright flange 64 of the lower bracket 63. The outer ends of the pivot arms 79 and 80 are pivotally secured to the pivot blocks 72 and 73, by the pivot pins 71. The linkage assembly 58 is substantially identical and the upper and lower pivot arms thereof are pivotally connected to pivot blocks 72 and 73 by pivot pins 83. The pivot pins 71 and 83 on any selected one of the pivot blocks 72 and 73 are preferably coaxial. Accordingly, downward or upward movement of the I beam 57 effects a corresponding movement in a lesser amount of the pivot blocks 72 and 73.

The upper pivot arms 67 and 68 and the location of the pivot blocks 72 and 73 along the connector rods 52 are so selected that the vertical axes of the connector rods 52 are substantially tangent to the outer surface 34 adjacent to the edges 27 and 28 of the shell 26 when the pressure sheet 16 is in engagement with said outer surface 34 as a result of downward pivoting of the upper pivot arms 67 and 68. The pivot points of the upper pivot arms 67 and 68 are also selected so that this same tangential relationship between the vertical axes of the connector rods 52 exists with respect to the outer surface 84 of the printing plate 13 supported upon the shell 26, as well as the outer surface 34 of said shell. That is, the upper pivot arms 67 and 68 are so selected and supported that, as the diameter of the surface engaged by the pressure sheet 16 increases, the location of the pivot blocks 72 and 73, hence the lengthwise axes of the connector rods 52 supported thereon move outwardly a corresponding distance whereby the condition of tangency remains in effect. Thus, the axes of the connector rods 52 always remain substantially perpendicular to the horizontal plane defined by the lower edges 27 and 28 of the shell 26 within the operating range of the apparatus 10. The above description with respect to the linkage unit 56a applies equally well to the other linkage units 56 used in the operating mechanism 17 of the apparatus 10.

Where the apparatus 10 is designed for producing printing plates for a rotary press utilized in printing cartons, for example, the circumference of a cylinder defining the shell 26 may be 56 inches in circumference to correspond to the diameter of the press rolls in some types of rotary printing presses. The apparatus 10 can be adapted for shaping and bonding printing plates having an inside circumference of 61 inches by placing on the outer surface 34 of the shell 26 a semicylindrical adapter shell 87 (Figure 4) which is of uniform thickness. The axes of the connector rods 52 will still remain perpendicular to the plane defined by the edges 27 and 28 of the shell 26 under these circumstances.

The downward movement of the operating mechanism 17 is produced in this embodiment by means of the power cylinders 91 and 92 which are supported upon the upper ends of the end members 18 and 19, respectively, and which have downwardly projecting piston rods 93 and 94 secured at their lower ends to the respective ends of the I beam 57. The power cylinder 91 is connected by the conduits 96 and 97 to the manually or pedally controlled valve 98 which may be connected through a conduit 99 to a source 101 of pressure fluid. The power cylinder 92 is also connected to the valve 98 by means of conduits 102 and 103.

A heating unit 106 is disposed within the cavity 107 beneath and defined by the shell 26. In this embodiment, said unit 106 is comprised of a pair of gas burners 108 and 109 (Figure 3) which are connected by conduits 111 and 112 to a conventional source of gas (not shown). The gas burners 108 and 109 are supported at their opposite ends by brackets, such as the bracket 113 shown in Figure 3, which are mounted upon the end plates 29 and 30.

*Operation*

Having assembled the apparatus 10 and adjusted it for operation with respect to a semicylindrical printing plate 13 of average thickness, the valve 98 is manually operated so that the pressure sheet 16 is moved upwardly away from the outer surface 34 of the shell 26 to a position substantially as appearing in Figure 3. The gas burners 108 and 109 are then lighted and the stacked but unbonded laminae for the printing plate 13 are placed upon the outer surface 34 of the shell 26 under the pressure sheet 16. Ordinarily, such laminae are preshaped by means such as the structure disclosed in my copending application serial No. 726,537, entitled "Laminated Printing Plate and Process for Making Same." The laminae may include an electrotype printing surface and may be substantially similar to those disclosed in my copending application Serial No. 726,537. A layer of bonding material, usually a resin of the heat responsive or heat activated type, is used between the adjacent laminae. The valve 98 is then actuated to cause the piston rods 93 and 94 to be urged downwardly, thereby acting through the I beam 57 and the linkage units 56 to move the connectors 44, hence the edges of the pressure sheet 16, downwardly until said pressure sheet firmly engages and embraces the outer surface of the printing plate 13. The pressure applying position of the sheet 16 where the adapter sheet 87 is not used appears in broken lines in Figure 3. The force created by the linkage units 56 operating through the connectors 44 is directed vertically downwardly because of the guiding control effected upon the I beam 57 by the end members 18 and 19. Thus, such force is also directed substantially tangential to the outer surface 84 of the printing plate 13 adjacent to its lower circumferential edges and is transmitted to the printing plate 13 uniformly around its entire surface with at least the major component being directed radially inwardly thereof. Furthermore, such force will be uniformly distributed so that it is substantially the same near the circumferential edges 38 and 39 of the printing plate 13 as it is midway between such edges. As pressure is applied to the laminae, the heat generated by the burners 108 and 109 will render the bonding material flowable. After a proper time interval has elapsed during which pressure is applied by the pressure sheet 16 to the printing plate 13 and after the bonding material has rigidified, the valve 98 is operated to cause the piston rods 93 and 94 to retract and thereby move the pressure sheet 16 upwardly away from the printing plate 13 on the support member 12. The printing plate 13 can now be moved sidewardly off of the shell 26 and when sufficiently cooled is ready for final processing and use. The bonding operation securely connects the laminae to form the semicylindrical printing plate 13.

Under some circumstances, and particularly where it is desirable to speed up the production of the laminated printing plate 13, the individual laminae may be assembled in proper relationship with each other upon a semicylindrical shell similar to the adapter shell 87 in Figure 4 before they are placed within the forming apparatus 10. Accordingly, the printing plate with its supporting shell can be removed from the apparatus 10 as soon as the heat and pressure applying operation has been performed and the danger of subsequent warping during cooling is substantially reduced. Furthermore, the printing plate and its supporting shell can be moved at once into a cooling apparatus for accelerating the cooling and rigidification of the printing plate after the heat and pressure operations have been performed. An apparatus whereby such cooling may be effected is shown in substance in Figure 4 and hereinafter described.

The insertion of a supporting or adapter shell 87 between shell 26 and the pressure sheet 16 for the purpose of forming and bonding a printing plate 13 of a large diameter will not change the above described operation. The pressure applying position of the sheet 16, where the adapter 87 is used, is shown in Figure 4. Thus, the apparatus 10 will operate satisfactorily regardless of variations in thickness from one printing plate to the next so long as such thicknesses and changes in diameter are within the operation limitations for which the apparatus was designed.

Figures 4 and 5 illustrate, in addition to the adapter shell 87, an alternate bonding apparatus 112 wherein the semicylindrical shell 113, upon which the laminae and shell 87 are supported, is provided with an integral heat exchange jacket 114 along substantially the full length and width of its lower, concave side. The jacket 114 is filled with a suitable heat exchange fluid, such as oil, into which one or more immersion type heaters 116 are inserted and connected by the conductors 117 to a convenient source of electrical energy. The apparatus 112 has end plates 118 and 118a which are generally similar to the end plates 29 and 30 of the apparatus 10 (Figure 3). The end plates 118 and 118a are supported upon a base frame 120 including the legs 119 and 119a. A cross member, such as the I beam 121, is secured in a horizontal position by convenient means, such as welding, between and to the legs 119 and 119a at the opposite ends of said base frame 120. A pair of parallel, substantially horizontal pivot shafts 124 and 125 extend between and are rotatably supported upon the end plates 118 and 118a. A pair of inner levers 126 and 126a are mounted respectively upon the pivot shafts 124 and 125 at points on each lever approximately midway between the ends thereof. A plurality of outer levers 127 and 127a are mounted upon the pivot shafts 124 and 125, respectively, so that they extend in substantially diametrically opposite directions from the inner levers 126 and 126a respectively. Thus, when the inner levers are disposed beneath the heat exchange jacket 114, the outer ends of the outer levers are disposed directly below the corresponding outer edges of the shell 113. Accordingly, upward movement of the inner levers 126 and 126a effects a corresponding downward movement of the outer levers 127 and 127a.

The end plates 118 and 118a (Figure 5) have inwardly extending substantially vertical guide ribs 128 and 129 which pass through the axis of the shell 113. A cross bar 130, which extends between the end plates 118 and 118a engages at its opposite ends the guide ribs 128 and 129 whereby movement of the cross bar 130 is restricted to a vertical movement. A cam 133 is mounted upon the cross bar 130 and upon the upper end of the piston rod 131 of the hydraulic cylinder 132 for engagement with the inner ends of the inner levers 126 and 126a. Roller bearings 134 may be provided upon the cam surfaces for facilitating such engagement. The cam 133 is designed so that it will simultaneously engage the inner ends of the inner levers 126 and 126a and, when upwardly moved by the hydraulic cylinder 132, will cause simultaneously equal pivotal movement of the outer levers 127 and 127a around their respective shafts 124 and 125.

The outer levers 127 and 127a may be pivotally secured to means, such as the pivot blocks 72a and 73a, whereby the pressure sheet 16a is secured to the outer levers in substantially the same manner as set forth above with respect to the apparatus 10 of Figure 3.

The outer levers 127 and 127a operate in the same manner as the pivot arms 67 and 68 in the apparatus 10. Thus, the operation of the alternate bonding apparatus 112 is in substance the same as the operation set forth above with respect to the apparatus 10.

The bonding apparatus 12 may be converted from a heating to a cooling apparatus by de-energizing the heaters 116 and filling the heat exchange jacket 114 with a suitable coolant. The complete bonding operation would advantageously be performed by using two separate machines 10, one providing heat and the other effecting cooling.

Although particular preferred embodiments of the invention have been described in detail above for illustrative purposes, it will be understood that variations or modifications of such disclosure, which lie within the scope of the appended claims, are fully contemplated.

What is claimed is:

1. Apparatus for forming and bonding laminae together to form a laminated printing plate, comprising: an upright base frame; a support member mounted upon the upper end of said base frame, said support member having a semicylindrical surface, the circumferential edges of which surface substantially define a horizontal plane, said member having a cavity therewithin between said plane and said surface; a flexible sheet of substantial tensile strength extending substantially parallel with said surface from one circumferential edge thereof to the other, the portion of said sheet opposite said surface being uniformly and radially movable toward and away from said surface; linkage including a pair of arms pivotally supported upon said base frame at points thereon spaced horizontally from each other and located below said plane, each arm having one end spaced from the pivot point on said frame and movable in a direction substantially perpendicular to said plane; adjustable connecting means secured to and respectively between said circumferential edges of said flexible sheet and said one end of said arms; and power means connected to said arms for effecting said movement of said arms whereby said radial movement of said sheet is effected and the force applied to said sheet by said power means through said linkage and said connecting means is in a direction perpendicular to said plane when said flexible sheet is holding the laminae snugly against said semicylindrical surface, the spacing between the pivot points of said arms being arranged so that the thickness of said printing plate can be varied substantially while the direction in which said force is applied by said linkage to said flexible sheet will remain substantially perpendicular to said plane.

2. The structure of claim 1 wherein said linkage includes a second pair of arms pivotally connected near one end of each to the said one ends of the first mentioned pair of arms, and bracket means secured to said power means and pivotally connected to said second pair of arms near the other ends whereby said force is transmitted from said power means to said linkage.

3. The structure of claim 1 wherein the pivot points on said pair of arms are spaced from both ends of said arms, and actuating means connected to said power means and engageable with the other ends of said arms for effecting said perpendicular movement, whereby said force is applied to said sheet.

References Cited in the file of this patent

UNITED STATES PATENTS

| | | |
|---|---|---|
| 1,434,022 | Peed | Oct. 31, 1922 |
| 2,460,468 | Renier | Feb. 1, 1949 |
| 2,489,496 | O'Brien | Nov. 29, 1949 |
| 2,494,281 | Batchelor et al. | Jan. 10, 1950 |
| 2,653,644 | Overman et al. | Sept. 29, 1953 |
| 2,686,552 | Faeber et al. | Aug. 17, 1954 |
| 2,807,306 | Bigelow | Sept. 24, 1957 |